(12) United States Patent
Banks et al.

(10) Patent No.: US 8,566,423 B2
(45) Date of Patent: *Oct. 22, 2013

(54) SCALABLE PUBLISH/SUBSCRIBE MESSAGING SYSTEMS AND METHODS

(75) Inventors: Andrew D. Banks, Romsey (GB);
Gavin D. Beardall, Alresford (GB);
Adrian D. Dick, Southampton (GB); Ian C. Vanstone, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1001 days.

This patent is subject to a terminal disclaimer.

(21) Appl. No.: 12/236,563

(22) Filed: Sep. 24, 2008

(65) Prior Publication Data

US 2009/0138572 A1    May 28, 2009

(30) Foreign Application Priority Data

Nov. 22, 2007   (EP) ..................................... 07121343

(51) Int. Cl.
*G06F 15/16*     (2006.01)
*G06F 9/44*      (2006.01)
*G06F 3/00*      (2006.01)

(52) U.S. Cl.
USPC ............................. 709/218; 717/118; 719/315

(58) Field of Classification Search
USPC ............................. 709/218; 717/118; 719/315
See application file for complete search history.

(56) References Cited

U.S. PATENT DOCUMENTS

| | | | | |
|---|---|---|---|---|
| 6,154,781 A | * | 11/2000 | Bolam et al. | 709/238 |
| 6,158,007 A | * | 12/2000 | Moreh et al. | 726/1 |
| 2003/0135556 A1 | * | 7/2003 | Holdsworth | 709/206 |
| 2005/0135260 A1 | * | 6/2005 | Todd | 370/241 |
| 2006/0136256 A1 | * | 6/2006 | Roots et al. | 705/1 |

* cited by examiner

*Primary Examiner* — Ranodhi Serrao
(74) *Attorney, Agent, or Firm* — Andrea Bauer; Hoffman Warnick LLC

(57) ABSTRACT

A publish/subscribe messaging network in which a distributed set of publish/subscribe brokers comprises a first subset of publish/subscribe brokers, each arranged to store proxy subscription information for the whole of the distributed set of brokers; and a second subset of publish/subscribe brokers, each configured to send subscription information for local subscribers to one or more brokers within the first subset of publish/subscribe brokers, and configured to request, from a broker within the first subset of brokers, proxy subscription information following receipt of a message.

11 Claims, 6 Drawing Sheets

SCALABLE PUBLISH/SUBSCRIBE MESSAGING SYSTEMS AND METHODS

FIELD OF THE INVENTION

The present invention relates to publish/subscribe messaging systems and, in particular, provides a method and apparatus supporting scalability within a collection of publish/subscribe systems.

BACKGROUND OF THE INVENTION

Within a messaging network, messages may be sent from one data processing system to other systems via one or more message brokers that handle routing and, in many cases, formatting and other services in relation to the messages. The brokers may be located at intermediate network locations between the message senders and receivers, for example running on powerful systems at communication hubs, or at various points within a distributed multi-broker network.

Many message brokers support the publish/subscribe communication paradigm. This involves publishers sending publications to a message broker, and the broker forwarding the publications to a set of subscribers who have registered their interest in receiving communications of that type. Typically, publish/subscribe brokers route publications to subscribers without the publishers needing to know which subscribers are interested. The publish/subscribe paradigm allows subscribers to receive the latest information relating to a subject area of interest (for example, stock prices or events such as news flashes or store special offers) without having to proactively and repeatedly request that information from each of the publishers.

A typical publish/subscribe environment has a number of publisher applications sending messages via a broker to a potentially large number of subscriber applications located on remote computers across a network. The subscribers register with the broker and identify the message types they wish to receive, and this information is stored at the broker. In many publish/subscribe implementations, subscribers specify one or more topic names which represent the message types they wish to receive. When publishers send their messages to the broker, the publishers assign topic names to the messages and the broker uses a matching engine to compare the topics of received messages with stored subscription information for its registered subscribers. This comparison determines to which subscribers the message should be forwarded. Topics are often specified hierarchically, for example using a character string format such as "root/topicLevel1/topicLevel2", and topics specified within received messages are compared with subscriptions using a matching algorithm that iteratively steps through the topic hierarchy.

Although subscription matching often involves checking topic fields within message headers, the matching process may additionally or alternatively involve checking other message header fields and/or checking message content and/or filtering messages based on some additional information. For example, a message broker implementing the Java Message Service (JMS) (Java and all Java-based trademarks are trademarks of Sun Microsystems, Inc. in the United States, other countries, or both), typically allows filtering based on message properties, but not based on the application data that is the message content or "payload". A message broker may perform additional functions, such as formatting or otherwise processing received messages before forwarding them to subscribers.

A commercially available example of a message broker product that supports the publish/subscribe paradigm is IBM Corporation's WebSphere Message Broker, as described in the documents "IBM WebSphere Message Broker Version 6 Release 0—Introduction", IBM Corporation, July 2006, and "IBM WebSphere Message Broker Version 6 Release 0—Publish/Subscribe", IBM Corporation, July 2006. A message broker may be associated with an underlying messaging product that handles the complexity of providing assured message delivery over a heterogeneous network. For example, IBM Corporation's WebSphere MQ messaging products provide such messaging functions, and are described in a number of publications from IBM Corporation including IBM publication reference No. GC34-6590-01 "WebSphere MQ Clients", June 2005, (IBM and WebSphere are registered trademarks of International Business Machines Corporation).

One known publish/subscribe messaging architecture implements a publish/subscribe matching engine on the same data processing system as a subscriber application. Publishers send publications to this system (and other systems, via multicasting) and the publish/subscribe matching engine determines which publications are of interest to the local subscriber application program and should be passed to that application program. Any publications that are not of interest to the local subscriber application program are discarded, and in many cases a matching engine will discard the vast majority of received publications.

This transmission of large numbers of unwanted publications, and the processing required to discard them at each receiving system, is wasteful of communication bandwidth and of the data processing resources of the subscriber's system. Such known solutions will not satisfy the needs of many businesses for increased message throughput with high performance (scalability), despite efforts by the solution providers to design matching algorithms that efficiently discard unwanted publications.

FIG. 1 shows a known prior art messaging network 10, which comprises a plurality of message brokers 12. These brokers 12 are assumed to be connected together loosely in a network, such as internal Intranet within a business organization. The message brokers 12 together form a collective, which provide a publish/subscribe messaging network to publishers and subscribers. Each publisher and subscriber is connected to a local message broker 12. For each subscriber who subscribes to a topic for the first time, a proxy subscription 14 has to be sent out to the other brokers 12 within the network 10. For example, a subscriber at message broker "A" causes proxy subscriptions 14 to be sent out to all brokers 12 in the collective.

A proxy subscription 14 is sent by the specific message broker "A" to all of the other message brokers 12 within the network 10. If there were many subscribers and many topics then each broker 12 will end up having to hold a large number of the proxy subscriptions 14. This creates a relatively large storage requirement on each and every message broker 12. In addition, every time a subscriber unsubscribes from a topic, then a message has to be sent to each message broker to cancel the proxy subscription 14.

In the prior art system, every time a subscriber subscribes to a new topic, then a proxy subscription 14 is transferred to all of the brokers 12 in the network 10. When a publisher that is connected to the message broker "B" (shown in FIG. 2), publishes a message to the same topic, then that broker 12 already has a proxy subscription 14 for the subscriber connected to the node "A", so a message 16 is delivered directly to the subscriber's broker 12. The broker "A" formats that message 14 in a conventional manner and transmits it onwards to all of the subscribes connected to the node "A" that are subscribed to the relevant topic.

SUMMARY OF THE INVENTION

In the context of the present invention, the term "publish/subscribe broker" is intended to include a publish/subscribe matching engine that is implemented at an intermediate network node between publishers and subscribers, but the term is also intended to include a publish/subscribe matching engine when implemented on the subscriber's data processing system or the publisher's system. Some publish/subscribe networks include subscribers that are local to a respective broker and subscribers or subscribers that are remote from any broker.

The publish/subscribe paradigm is an efficient way of disseminating selected information to multiple users, and is especially useful for environments in which the set of publishers and/or subscribers can change over time, and where the number of publishers and/or subscribers can be large. Although some subscriptions are 'non-durable' (i.e., remain active only while a subscribing application is connected to the broker), many subscriptions are 'durable' and remain active until the subscribing application explicitly unsubscribes. When a durable subscriber no longer wishes to receive publications, the subscriber can unsubscribe from the broker (or unsubscribe from a particular topic or set of topics) and this leaves the subscriber in control of which publications they receive.

As noted above, multicast messaging is wasteful when it involves sending messages to a large number of brokers (each running on the same system as a respective one or more subscriber applications) if most of the brokers then discard most messages. One option to reduce this problem is to ensure that all of the brokers within a distributed broker network are aware of the requirements of the subscribers that are associated with each other broker within the network. Then only a required subset of published messages are sent between brokers. This is achieved by each broker sending its subscription information to each other broker, and each broker storing proxy subscription information for other brokers. However, the distribution of subscription information also has associated overheads, and these overheads can be significant if there are frequent changes to the set of active subscribers or their message requirements.

According to a first aspect of the present invention, there is provided a publish/subscribe messaging network in which a distributed set of publish/subscribe brokers comprises: a first subset of publish/subscribe brokers, each arranged to store proxy subscription information for the whole of the distributed set of brokers; a second subset of publish/subscribe brokers, each configured to send subscription information for local subscribers to one or more brokers within the first subset of publish/subscribe brokers, and configured to request, from a broker within the first subset of brokers, proxy subscription information following receipt of a message.

According to a second aspect of the present invention, there is provided a method for selective propagation of subscription information within a distributed set of publish/subscribe brokers, comprising the steps of: propagating proxy subscription information for the whole of the distributed set of brokers to each of a first subset of the brokers, wherein the first subset is less than the whole set, and storing the proxy subscription information for the whole of the distributed set of brokers at each of the first subset of brokers; and for each of a second subset of brokers outside of the first subset, requesting, from a broker within the first subset of brokers, proxy subscription information following receipt of a message.

Owing to the invention, it is possible to provide a network and method of optimizing subscription propagation within a collection of publish/subscribe brokers. In the known systems, when a collection of pub/sub brokers, known as a collective, are grouped together in a homogeneous way proxy subscriptions are forwarded to every member so that any broker is able to publish or subscribe to any other. This means that when there are a large number of member brokers and a large number of different topic subscriptions distributed over the collective the size of the table needed to store the proxy subscriptions will become very large and the messages needed to maintain it, if the subscriptions are being created and destroyed dynamically, could get very large to the extent that the system could be swamped In the invention, a subset of brokers is nominated as a subscription repository store. Thus only the proxy subscriptions that a publisher, not in that group, has a specific interest in is maintained by it locally, so keeping down the amount of storage needed to maintain it and dramatically reducing the flow of messages needed to keep track of subscriptions and unsubscriptions which will allow the collective to scale better. The invention provides a specific, and probably more powerful, set of brokers within the collective that are grouped together and used as the subscription repository. Whenever a subscription is made to a broker, not in that repository group, it sends a proxy subscription to one of the brokers in the repository group, but not to any other brokers within the collective. When a proxy subscription is received by a repository broker it forwards it on to all brokers within that group. When a publisher opens a topic on one of the outlying brokers a message is sent to the repository and it returns the proxy subscriptions that match the topic. The publishing broker will cache that subscription locally. The repository systems keep a record of all the brokers they have sent a proxy subscription to so that when an unsubscribe is received they know which brokers to send it to. Cached proxy subscriptions will have an expiry so that they will need to be remade after a certain time.

Conventional design of publish/subscribe broker topologies has assumed a homogeneous broker network, and the inventors of the present invention have recognized that this assumption is not valid for many real businesses. In one embodiment of the present invention, the inventors have determined that proxy subscription management within a publish/subscribe broker network can be greatly improved by assigning different proxy subscription management roles to particular brokers according to their data storage resources and/or data processing resources, and/or the reliability or bandwidth of their network communication links. The inventive solution then avoids propagating many subscription updates to brokers other than a designated first subset of brokers, reducing communication overheads and reducing the storage requirements of brokers outside the first subset.

Furthermore, embodiments of the present invention are able to take account of the different relationships between systems within a broker network (as well as or instead of taking account of their system and link characteristics). This may involve, for example, avoidance of proactive propagating of proxy subscription information for two brokers A and B to the respective other broker (B or A) if they are unlikely to need to communicate with each other, or only rarely. That is, if each of A and B are unlikely to provide messages of interest to subscribers at the respective other broker, there is no need for A and B to exchange their respective subscription information. A and B can defer sharing their respective subscription information until a need arises for them to communicate with each other (and this need may never arise). Meanwhile, each broker's subscription information is sent to another broker C if broker C is likely to be a source of publications that are of interest to subscribers at each of broker A and broker B.

Broker C may be running on a powerful server computer at an organization's head office, whereas brokers A and B may be running at branch offices or branch stores. A and B may only need to communicate with each other very rarely, whereas each of A and B require two-way communications with broker C. Conventional broker networks have disregarded these different roles and assumed a homogeneous network in which any broker is equally likely to need to communicate with any other broker in the network.

Thus, embodiments of the present invention can reduce the communication and processing overheads associated with management of proxy subscriptions, and thereby improve message processing performance as well as reducing latency problems associated with the processing and propagation of subscription updates.

BRIEF DESCRIPTION OF THE DRAWINGS

Embodiments of the present invention will now be described, by way of example only, with reference to the accompanying drawings.

DETAILED DESCRIPTION OF THE INVENTION

Figure 1:
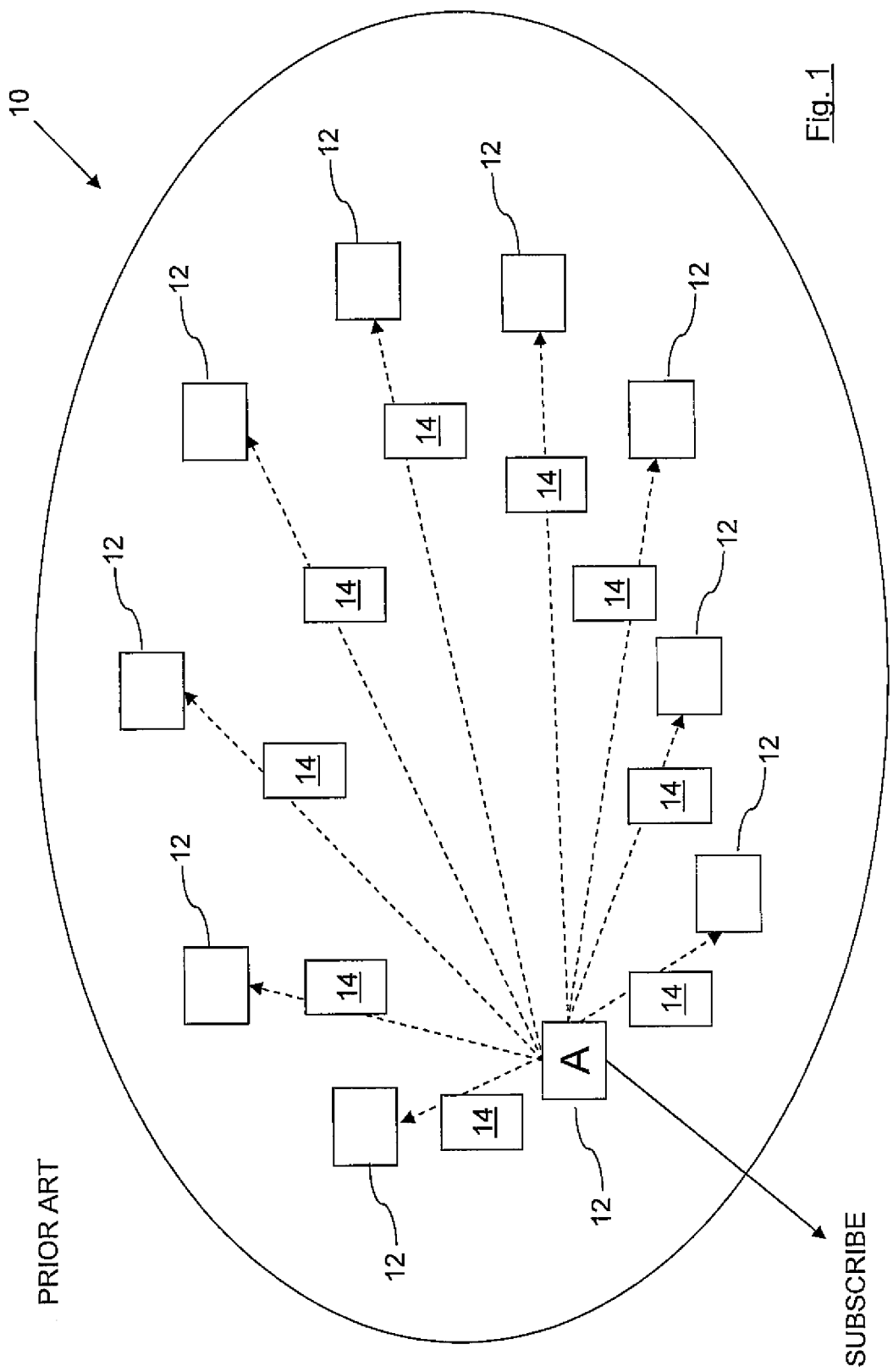
FIGS. 1 and 2 are schematic diagrams of a prior art publish/subscribe messaging network.
Figure 2:
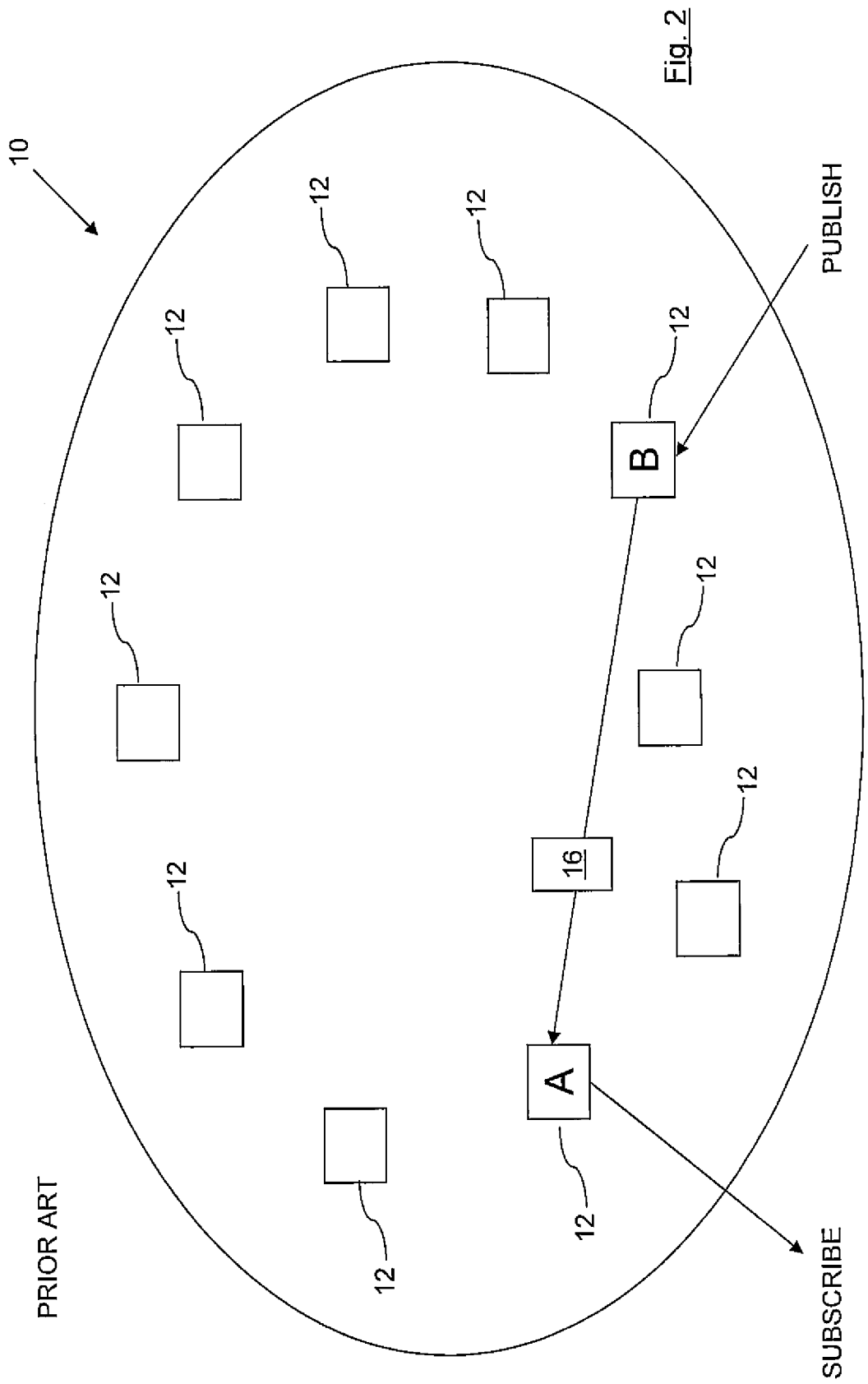
Figure 3:
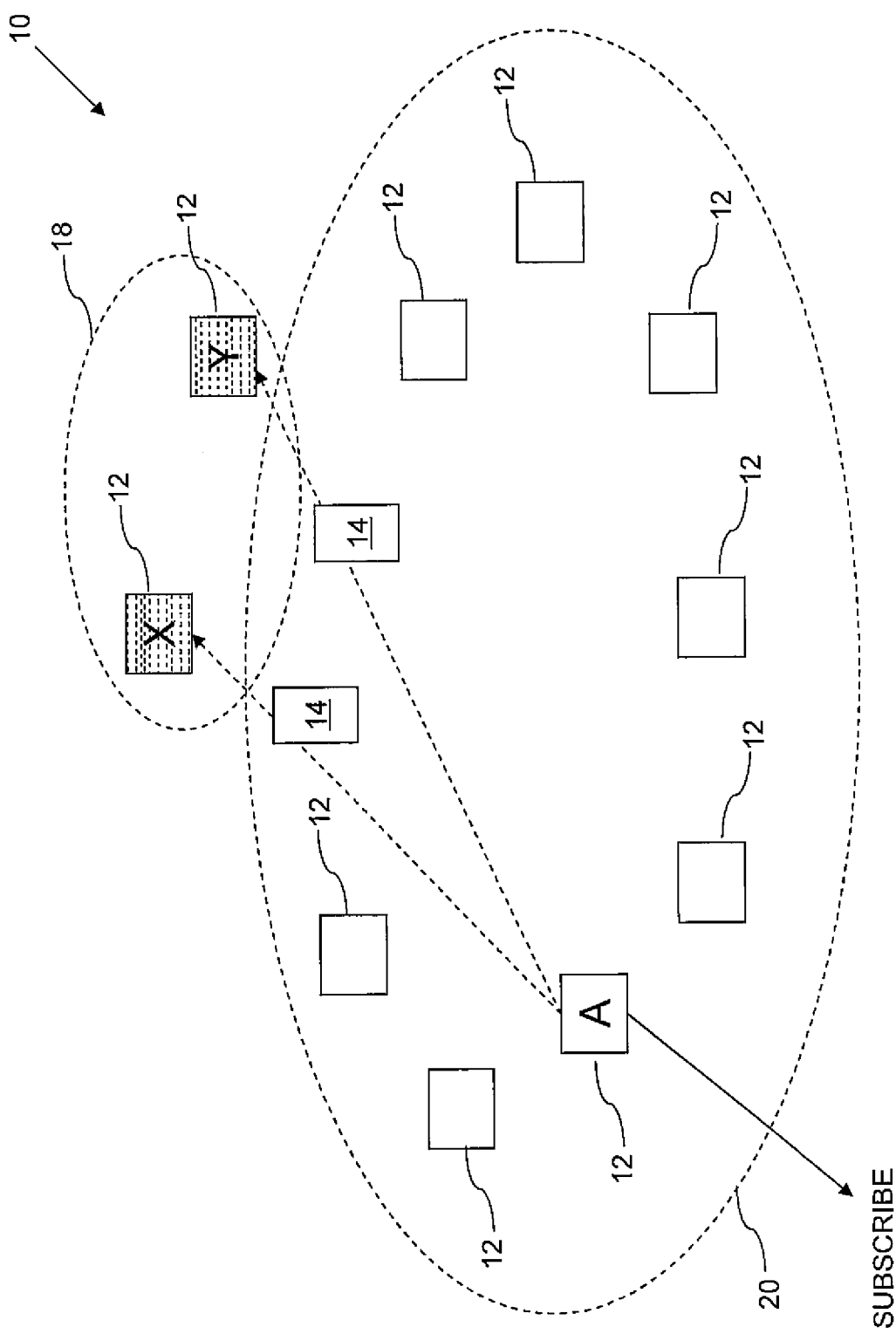
FIGS. 3, 4 and 5 are schematic diagrams of a publish/subscribe messaging network according to an embodiment of the invention.

An embodiment of the improved network 10 is shown in FIG. 3. The publish/subscribe messaging network 10, which is made up of the distributed set of publish/subscribe message brokers 12, comprises two subsets 18 and 20 of the message brokers 12. The first subset 18 of publish/subscribe brokers 12, is constructed so that each broker 12 in that subset 18 is arranged to store proxy subscription 14 information for the whole of the distributed set of brokers 12. The second subset 20 of publish/subscribe brokers 12, is composed of brokers 12 that are each configured to send subscription information 14 for local subscribers to one or more brokers 12 within the first subset 18 of publish/subscribe brokers 12.

Effectively, a subset 18 of the brokers 12 is nominated as a subscription repository store. Thus only the proxy subscriptions 14 that a publisher, not in that group, has a specific interest in is maintained by it locally, thereby keeping down the amount of storage needed to maintain it and dramatically reducing the flow of messages needed to keep track of subscriptions and unsubscriptions which will allow the network 10 to scale better.

The system 10 of FIG. 3 provides a specific, and more powerful, set 18 of brokers 12 within the network 10 that are grouped together and used as a subscription repository. Whenever a subscription is made to a broker 12, that is not in the repository group 18, then that broker 12 sends a proxy subscription 14 to one of the brokers in the repository group (or to all of them), but not to any of the brokers that are outside the predefined subset 18. When a proxy subscription 14 is received by a repository broker 12 (in the subset 18) that broker 12 forwards it on to all brokers within that group.

For example, as shown In FIG. 3, a subscriber made to broker "A" causes proxy subscriptions 14 to be sent only to the nominated "repository" brokers "X" and "Y". In this example, the broker "A" is shown as sending the proxy subscription 14 to both brokers 12 in the group 18, but for a working embodiment, it is sufficient that the brokers 12 in the second subset 20 send their proxy subscriptions 14 to one broker 12 within the first subset 18, as the proxy subscriptions can be propagated within the subset 18 by the repository brokers 12 themselves. In this way, the network 10 is configured to propagate proxy subscription information 14, for the whole of the distributed set of brokers 12, to all of the brokers 12 within the first subset 18.

Figure 4:
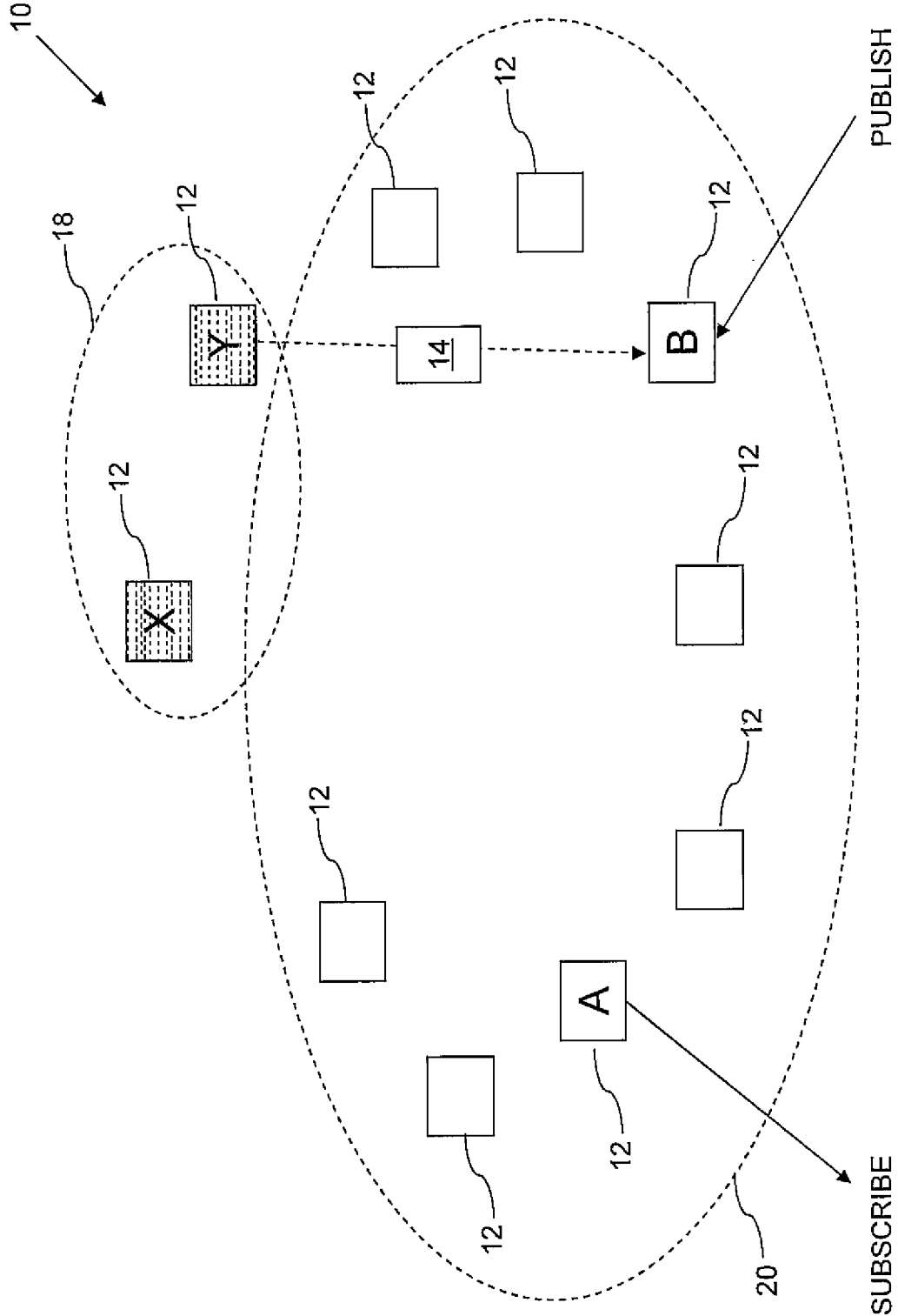
Figure 5:
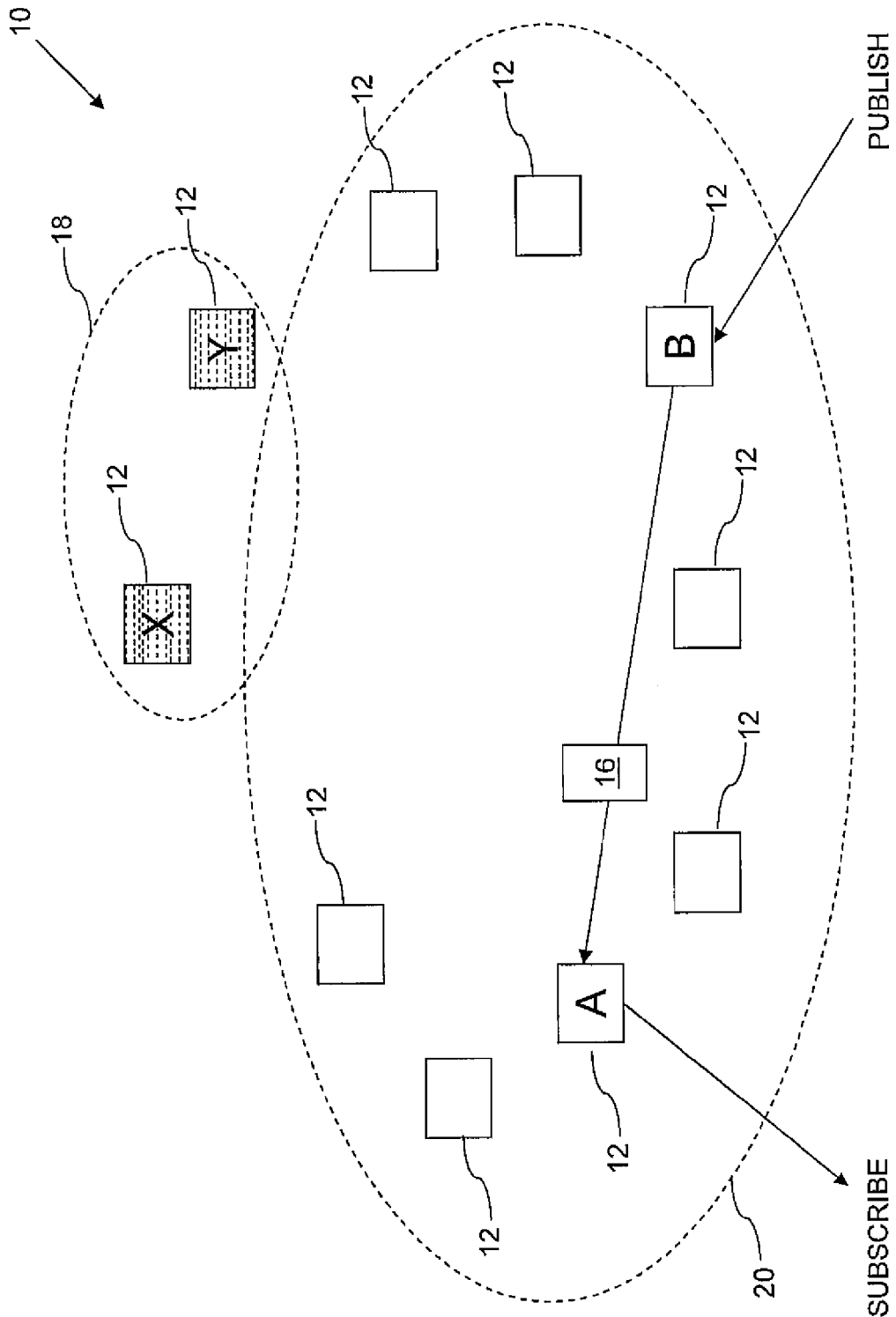

FIG. 4 shows how the network 10 reacts to the receipt of a publish message at a broker 12 that is one of the brokers 12 in the second set 20 of brokers 12. The broker "B" in the second set 20 is configured to request, from a broker 12 within the first subset 18 of brokers 12, proxy subscription information 14 following receipt of a message. When a publisher comes in on broker "B", that broker 12 doesn't have a proxy subscription 14 for the subscriber so the broker "B" has to get the proxy subscription 14 from one of the repository brokers 12; either broker "X" or "Y", these brokers 12 being within the first set 18 of brokers 12. The first subset 18 of brokers 12 is configured to propagate requested subscription information to requestor brokers 12 within the second subset 20.

Once the broker "B" has acquired the proxy subscription 14 from one of the repository brokers 12 contained within the first subset 18 of the brokers 12 within the network 10, then the broker "B" can deliver a message 16 to the correct broker 12, according to the content of the proxy subscription 14. The publisher, through the broker "B", can deliver the message 16 to the subscriber's broker "A" as it now holds a proxy subscription 14. This proxy-subscription 14 will be held for a period of time but will eventually be removed or expire if it hasn't been used. If another publisher comes in again on the same topic, the broker "B" will have to re-get the proxy subscription 14 as described above with reference to FIG. 4. In this way, each requester broker 12 is configured to store the requested proxy subscription information 14 in local storage, and this storage of the requested proxy subscription 14 in the local storage can be for a time-limited period. The network 10 also comprises local publishers which may be directly connected to the requester broker 12, or may be connected to a broker 12 within a broker group that includes the requestor broker 12.

Figure 6:
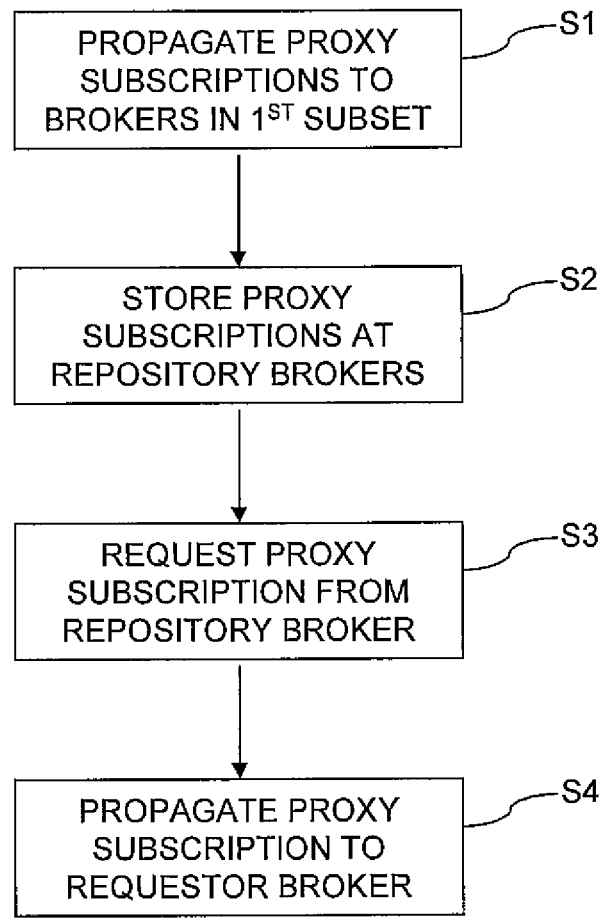
FIG. 6 is a flowchart of a method of operating the messaging network of FIGS. 3, 4 and 5.

The method of operating the network 10, for the purpose of selective propagation of subscription information within a distributed set of publish/subscribe brokers 12 is summarized in FIG. 6. The method comprises the steps of, firstly, propagating (step S1) the proxy subscription information 14 for the whole of the distributed set of brokers 12 to each of a first subset 18 of the brokers 12, where the first subset 18 is less than the whole set, and secondly storing (step S2) the proxy subscription information 14 for the whole of the distributed set of brokers 12 at each of the first subset 18 of brokers 12. Once this propagation and storage is achieved (which is an ongoing process), the method further comprises for each of the second subset 20 of brokers 12 outside of the first subset 18, requesting (step S3), from a broker 12 within the first subset 18 of brokers 12, proxy subscription information 14 following receipt of a message, and propagating (step S4) the requested subscription information from the repository broker 12 in the first subset 18 of brokers 20 to the requestor broker 12 within the second subset 20.

The foregoing description of the embodiments of this invention has been presented for purposes of illustration and description. It is not intended to be exhaustive or to limit the invention to the precise form disclosed, and obviously, many modifications and variations are possible.

The invention claimed is:

1. A publish/subscribe messaging network in which a distributed set of publish/subscribe brokers comprises:
   a computer hardware device including the publish/subscribe messaging network, and including:
   a first subset of publish/subscribe brokers, wherein each of the publish/subscribe brokers of the first subset is operable to exclusively store proxy subscription information for the whole of the distributed set of publish/subscribe brokers; and
   a second subset of publish/subscribe brokers, wherein each of the publish/subscribe brokers of the second subset of publish subscribe brokers is operable to send subscription information for local subscribers exclusively to one or more publish/subscribe brokers within the first subset of publish/subscribe brokers, and configurable to request, exclusively from at least one of publish/subscribe brokers within the first subset of publish/subscribe brokers, proxy subscription information following receipt of a publish message.

2. The network according to claim 1, wherein the network is configurable to propagate proxy subscription information for the whole of the distributed set of publish/subscribe brokers to each of the publish/subscribe brokers within the first subset of publish/subscribe brokers.

3. The network according to claim 1, wherein the first subset of publish/subscribe brokers is configurable to propagate requested subscription information to at least one requestor broker within the second subset of publish/subscribe brokers.

4. The network according to claim 3, wherein the at least one requestor broker is configurable to store the requested proxy subscription information in local storage.

5. The network according to claim 4, wherein the at least one requestor broker is configurable to store the requested proxy subscription information in the local storage for a time-limited period.

6. The network according to claim 3, further comprising local publishers which are operable to be at least one of: directly connected to the at least one requestor broker and connected to the at least one publish/subscribe broker within the second subset of publish/subscribe brokers.

7. A method for selective propagation of subscription information within a distributed set of publish/subscribe brokers, comprising:
   propagating, using a computer device, proxy subscription information for the whole of the distributed set of publish/subscribe brokers exclusively to each of the publish/subscribe brokers of a first subset of publish/subscribe brokers, wherein the first subset of publish/subscribe brokers is less than the whole of the distributed set of publish/subscribe brokers, and storing the proxy subscription information for the whole of the distributed set of publish/subscribe brokers at each of the publish/subscribe brokers of the first subset of publish/subscribe brokers; and
   for each of the publish/subscribe brokers of a second subset of publish/subscribe brokers outside of the first subset of publish/subscribe brokers, requesting, using the computer device, exclusively from at least one publish/subscribe broker within the first subset of publish/subscribe brokers, proxy subscription information following receipt of a publish message.

8. The method according to claim 7, further comprising propagating requested subscription information from at least one publish/subscribe broker in the first subset of publish/subscribe brokers to at least one requestor broker within the second subset of publish/subscribe brokers.

9. The method according to claim 8, further comprising storing the requested proxy subscription information in local storage at the at least one requestor broker.

10. The method according to claim 9, wherein the at least one requestor broker is configurable to store the requested proxy subscription information in the local storage for a time-limited period.

11. A computer program stored on a non-transitory computer readable medium, which when executed, selectively propagates subscription information within a distributed set of publish/subscribe brokers, the non-transitory computer readable medium comprising program code for:
   propagating proxy subscription information for the whole of the distributed set of publish/subscribe brokers exclusively to each of the publish/subscribe brokers of a first subset of publish/subscribe brokers, wherein the first subset of publish/subscribe brokers is less than the whole of the distributed set publish/subscribe brokers, and storing the proxy subscription information for the whole of the distributed set of publish/subscribe brokers at each of the publish/subscribe brokers of the first subset of publish/subscribe brokers; and
   for each of the publish/subscribe brokers of a second subset of publish/subscribe brokers outside of the first subset of publish/subscribe brokers, requesting, exclusively from at least one publish/subscribe broker within the first subset of publish/subscribe brokers, proxy subscription information following receipt of a publish message.

* * * * *